(12) United States Patent
Traore et al.

(10) Patent No.: US 9,155,062 B2
(45) Date of Patent: Oct. 6, 2015

(54) DISTRIBUTION OF LOCATION INFORMATION

(71) Applicant: Microsemi Frequency and Time Corporation, San Jose, CA (US)

(72) Inventors: Karim Traore, Palo Alto, CA (US); Samer H. Darras, Morgan Hill, CA (US)

(73) Assignee: MICROSEMI FREQUENCY AND TIME CORPORATION, San Jose, CA (US)

( * ) Notice: Subject to any disclaimer, the term of this patent is extended or adjusted under 35 U.S.C. 154(b) by 0 days.

(21) Appl. No.: 14/188,398

(22) Filed: Feb. 24, 2014

(65) Prior Publication Data

US 2014/0241244 A1    Aug. 28, 2014

Related U.S. Application Data

(60) Provisional application No. 61/768,122, filed on Feb. 22, 2013.

(51) Int. Cl.
*H04J 3/06* (2006.01)
*H04L 12/26* (2006.01)
*H04L 29/06* (2006.01)
*H04W 64/00* (2009.01)

(52) U.S. Cl.
CPC ............ *H04W 64/00* (2013.01); *H04J 3/0682* (2013.01); *H04J 3/0685* (2013.01); *H04L 43/0852* (2013.01); *H04L 43/106* (2013.01); *H04L 63/123* (2013.01); *H04W 64/003* (2013.01)

(58) Field of Classification Search
CPC ..... H04J 3/0667; H04J 3/0673; H04J 3/0697; H04J 3/0682; H04J 3/0685; H04L 43/0852; H04L 43/106; H04L 63/123; H04W 64/00
USPC .......................... 370/254–350; 709/201–213
See application file for complete search history.

(56) References Cited

U.S. PATENT DOCUMENTS

| | | | |
|---|---|---|---|
| 8,064,484 B2 | 11/2011 | Zampetti | |
| 8,385,212 B2 | 2/2013 | Zampetti et al. | |
| 8,386,765 B2 * | 2/2013 | Fries et al. | 713/150 |
| 8,427,963 B2 | 4/2013 | Zampetti et al. | |
| 8,467,309 B2 * | 6/2013 | Chan et al. | 370/252 |
| 8,594,134 B2 | 11/2013 | Zampetti et al. | |

(Continued)

OTHER PUBLICATIONS

U.S. Appl. No. 14/210,913, entitled "Distributed Two-Step Clock" filed Mar. 14, 2014.

(Continued)

*Primary Examiner* — Ayaz Sheikh
*Assistant Examiner* — Debebe Asefa
(74) *Attorney, Agent, or Firm* — Patterson & Sheridan, LLP

(57) ABSTRACT

In one aspect, a method of determining a geographical location of a base station is provided. The base station is within a coverage area of a master base station and requests geographical location information from the master base station through a first Precision Time Protocol (PTP) management message. The base station receives the geographical location information from the master base station through a second PTP management message. In addition, the base station determines the geographical location of the base station from the geographical location information included in the second PTP management message.

16 Claims, 10 Drawing Sheets

(56) References Cited

U.S. PATENT DOCUMENTS

| | | |
|---|---|---|
| 8,644,348 B2 | 2/2014 | Zampetti |
| 8,873,588 B2 * | 10/2014 | Joergensen .................. 370/503 |
| 2011/0087887 A1 * | 4/2011 | Luft et al. ..................... 713/178 |

OTHER PUBLICATIONS

U.S. Appl. No. 14/149,370, entitled "Universal Asymmetry Compensation for Packet Timing Protocols" filed Jan. 7, 2014.

* cited by examiner

Location Information 504

| Location Information | Description |
|---|---|
| UTC Time Stamp | UTC Time of position fix |
| Latitude | Latitude of fix |
| Longitude | Longitude of fix |
| GPS Quality Indication | Indication of GPS Quality |
| No. of satellites used for positioning | Number of satellites in use |
| Dilution of Precision | Dilution of position |
| Altitude | Mean sea level |

Figure 7

Management message fields

| Bits | | | | | | | | Octets | Offset |
|---|---|---|---|---|---|---|---|---|---|
| 7 | 6 | 5 | 4 | 3 | 2 | 1 | 0 | | |
| header | | | | | | | | 34 | 0 |
| targetPortIdentity | | | | | | | | 10 | 34 |
| startingBoundaryHops | | | | | | | | 1 | 44 |
| boundaryHops | | | | | | | | 1 | 45 |
| reserved | | | | actionField | | | | 1 | 46 |
| reserved | | | | | | | | 1 | 47 |
| managementTLV | | | | | | | | M | 48 |

Figure 8

Value of the actionField

| Action | Action taken | Value (hex) |
|---|---|---|
| GET | The management message shall carry a single management TLV. The managementId field of the TLV indicates the specific information that needs to be retrieved. The current values of the data identified by the managementId shall be returned in a management TLV with the actionField value set to RESPONSE. If an error occurs, a management error status TLV shall be returned with the actionField value set to RESPONSE. | 5 |
| SET | The management message shall carry a single management TLV. The data in the TLV shall be used to update the current value of the data identified by the managementId field. Attempts to set a static or nonconfigurable value shall return a management error status TLV. If the update is successful, a management message with the actionField value set to RESPONSE shall be returned. If an error occurs, a management error status TLV shall be returned with the actionField value set to RESPONSE. If the data identified by the managementId consists of several fields, the update shall be considered as an atomic actionField and the failure to update any item shall be considered an error in the execution of the SET. TLVs with data definitions that mix configurable and nonconfigurable data are not permitted. | 1 |
| RESPONSE | The data in the TLV shall be the current values of the data identified by the managementId field of the management message with the GET or SET actionField. The value of the managementId shall be identical to that in the requesting message. If the actionField required by the GET or SET actionFields could not be fully executed, the response shall be a management error status TLV. | 2 |
| COMMAND | The event indicated by the managementId field shall be initiated. The results of this command shall be acknowledged by a management message with actionField set to ACKNOWLEDGE. | 3 |
| ACKNOWLEDGE | An acknowledge management message is a response to a command management message. The value of the managementId shall be identical to that in the command message. If the command could not be executed, the acknowledge message shall be a management error status TLV. | 4 |
| Reserved |  | 5-F |

Figure 9

Value of the actionField for an Event-Report

| Action | Action taken | Value(hex) |
|---|---|---|
| EVENT-REPORT | The management message shall carry a single management TLV. The data in the TLV shall be used to convey information when an event occurs. | 5 |

Figure 10

Management TLV fields

| Bits | | | | | | | | Octets | TLV Offset |
|---|---|---|---|---|---|---|---|---|---|
| 7 | 6 | 5 | 4 | 3 | 2 | 1 | 0 | | |
| tlvType | | | | | | | | 2 | 0 |
| lengthField | | | | | | | | 2 | 2 |
| managementId | | | | | | | | 2 | 4 |
| dataField | | | | | | | | N | 6 |

Figure 11

ManagementId Values

| managementId name | managementID value (hex) | Allowed actions | Applies to |
|---|---|---|---|
| Applicable to all node types | 0000 – 1FFF | | |
| NULL_MANAGEMENT | 0000 | GET, SET, COMMAND | port |
| CLOCK_DESCRIPTION | 0001 | GET | port |
| USER_DESCRIPTION | 0002 | GET, SET | clock |
| SAVE_IN_NON_VOLATILE_STORAGE | 0003 | COMMAND | clock |
| RESET_NOW_VOLATILE_STORAGE | 0004 | COMMAND | clock |
| INITIALIZE | 0005 | COMMAND | clock |
| FAULT_LOG | 0006 | GET | clock |
| FAULT_LOG_RESET | 0007 | COMMAND | clock |
| Reserved | 0008 – 1FFF | – | – |
| Applicable to ordinary and boundary clocks | 2000 – 3FFF | – | – |
| DEFAULT_DATA_SET | 2000 | GET | clock |
| CURRENT_DATA_SET | 2001 | GET | clock |
| PARENT_DATA_SET | 2002 | GET | clock |
| TIME_PROPERTIES_DATA_SET | 2003 | GET | clock |
| PORT_DATA_SET | 2004 | GET | port |
| PRIORITY1 | 2005 | GET, SET | clock |
| PRIORITY2 | 2006 | GET, SET | clock |
| DOMAIN | 2007 | GET, SET | clock |
| SLAVE_ONLY | 2008 | GET, SET | clock |
| LOG_ANNOUNCE_INTERVAL | 2009 | GET, SET | port |
| ANNOUNCE_RECEIPT_TIMEOUT | 200A | GET, SET | port |
| LOG_SYNC_INTERVAL | 200B | GET, SET | port |
| VERSION_NUMBER | 200C | GET, SET | port |
| ... | | | |
| Reserved | 2022 – 3FFF | – | – |
| Applicable to transparent clocks | 4000 to 5FFF | – | – |
| TRANSPARENT_CLOCK_DEFAULT_DATA_SET | 4000 | GET | clock |
| TRANSPARENT_CLOCK_PORT_DATA_SET | 4001 | GET | port |
| PRIMARY_DOMAIN | 4002 | GET, SET | clock |
| Reserved | 4003 – 5FFF | – | – |
| Applicable to ordinary, boundary, and transparent clocks | 6000 – 7FFF | – | – |
| DELAY_MECHANISM | 6000 | GET, SET | port |
| LOG_MIN_PDELAY_REQ_INTERVAL | 6001 | GET, SET | port |
| Reserved | 6002 – BFFF | – | – |
| This range is to be used for implementation-specific identifiers | C000 – DFFF | – | – |
| This range is to be assigned by an alternate PTP profile | E000 – FFFE | – | – |
| Reserved | FFFF | – | – |

Figure 12

LOCATION_INFORMATION management TLV data field

| 8 Bits | Octets | TLV data offset |
|---|---|---|
| UTC Time Stamp | 6 | 0 |
| Latitude | 9 | 6 |
| Longitude | 10 | 6+9 |
| GPS Quality Indication | 1 | 6+9+10 |
| Dilution of Precision | 5 | 6+9+10+1 |
| Altitude | 9 | 6+9+10+1+5 |
| EOT | 1 | 6+9+10+1+5+9 |

Figure 13

DISTRIBUTION OF LOCATION INFORMATION

CROSS-REFERENCE TO RELATED APPLICATIONS

This application claims priority to U.S. provisional application having Ser. No. 61/768,122, filed on Feb. 22, 2013, which is hereby incorporated by reference in its entirety.

BACKGROUND OF THE INVENTION

1. Field of the Invention

Embodiments of the present invention relate generally to time and frequency alignment systems operating over packet-switched communications networks and, more specifically, to methods and apparatus for distributing location information in addition to precision time transfer.

2. Description of Related Prior Art

It has been recognized that by establishing the geographic location of a mobile telephone user, location-based services can be provided, thereby increasing the potential average revenue per user. It is also a federal mandate (in the USA) that, for emergency services, the geographic location of the origin of an emergency (i.e. E911) call be established with a prescribed level of accuracy. GPS-equipped mobile devices can establish their own geographic location if there is a good and unobstructed view of the sky. In other cases the location of the mobile station is established relative to the location of the serving base-station. That is, it is advantageous to establish the geographic location of the base-stations.

Outdoor base-stations can be equipped with GPS antenna/receiver functionality and thereby establish their location autonomously. In the case of smaller, typically indoor-mounted, base-stations, the option of self-positioning via GPS is not a viable option for reasons of cost and/or visibility of the sky. Determining the location of a base-station that does not have GPS functionality is done by manually surveying the location where the base-station is installed prior to deployment.

Such pre-deployment surveying does not satisfactorily address the case where the base-station itself can be moved. Pre-deployment surveying is also not appropriate in the case where the base-station device is purchased and installed by the end-user.

The provider of mobile communication services requires knowledge of the location of the base-station for variety of reasons such as billing and often the service contract presupposes a deployment location. Consequently it will be advantageous to ascertain the location of a deployed base-station, albeit approximately, in order to deliver mobile communication services.

The conventional methodology for distributing timing to base-stations is depicted in FIG. 1. The various base-stations (BS-x) 120 are connected back into the service provider network via communication links 160. The provider has at least one location that can operate as a master clock (MCLK) 110 that represents the timing reference for the base-stations in the (sub)network that home in to the master clock. The master clock is usually associated with a Radio Network Controller (RNC) or a Base-Station Controller (BSC) or even the Mobile Switching Office (MSO). Legacy mobile telephony networks often used TDM links to implement the backhaul from the base-stations and these TDM links (e.g. T1/E1 or SONET/SDH) were suitable for carrying a (frequency synchronization reference signal.

It is increasingly common for the backhaul network to be replaced with a packet-switched network wherein the physical layer could be implemented by a wide variety of technologies including Ethernet (typically over optical fiber), microwave, ADSL/VDSL, and coax (cable-TV derivative). The timing information 270 in this case is delivered in the form of a packet flow 260. The technologies used for delivering timing in this situation are packet-based including precision time protocol (PTP) and/or network time protocol (NTP). Whereas legacy mobile telephony required simply a frequency reference, more recent advances require a time/phase reference (as well as frequency). Two-way methods such as PTP and NTP are required to support this requirement. As depicted in FIG. 2, timing information is delivered from the master base station 110 clock 215 to the slave clock 225 in the base station 120 over a packet network 250 wherein the processing elements 216 and 226 exchange packets via a flow 260.

Whereas FIG. 1 and FIG. 2 depict terrestrial methods for distributing time/frequency from the central location to the base-stations, they do not teach how the base-station can assess its own geographical location. In FIG. 3 a third approach is shown wherein all the elements (base-stations and master clock) derive their timing from a common source, namely a Global Navigation Satellite System (GNSS) 310 (the most commonly quoted example of a GNSS is the global positioning system (GPS) operated by the US Government). The satellite signal 330 is received by the terrestrial elements and by synchronizing to GNSS the terrestrial elements are indirectly aligning themselves in time/frequency. One advantage of the GNSS signal is that it provides not just timing but enables the receivers to establish their own geographical location(s). However, due to constraints such as cost and deployment location considerations, base-stations with GPS/GNSS functionality are usually macro-base-stations deployed outdoors; smaller base-stations (such as micro-, pico-, and femto-base-stations) are often deployed indoors and without a clear view of the sky.

SUMMARY OF INVENTION

Embodiments of the invention described here enable base-stations to establish an approximate location for themselves. Although approximate, the location information is adequate for most applications of location-based services and for network operators and mobile telephony service providers to validate the base-station.

In one aspect, a method of determining a geographical location of a base station that is within a coverage area of a master base station is provided. The method includes requesting geographical location information from the master base station via a first Precision Time Protocol (PTP) management message. The method further includes receiving the geographical location information from the master base station via a second PTP management message. In addition, the method includes determining the geographical location of the base station from the geographical location information included in the second PTP management message.

In another aspect, a wireless communication base station positioned within a coverage area of a master base station and configured to perform operations for determining a geographical location of the wireless communication base station is provided. The operations include requesting geographical location information from the master base station via a first PTP management message. The operations further include receiving the geographical location information from the master base station via a second PTP management message. In addition, the operations include determining the geographical location of the wireless communication base station from the geographical location information included in the second PTP management message.

In yet another aspect, a method for a base station to obtain location-proximity specific information from a master base station is provided. The method includes the step of requesting the location-proximity specific information from the master base station via a first PTP management message. Additionally, the method includes receiving the location-proximity specific information from the master base station via a second PTP management message.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 7 provides the information associated with location, according to an embodiment.

FIG. 8 is a table that depicts an assignment of fields to information carried in a management message, according to an embodiment.

FIG. 9 is a table that provides an explanation of the actions taken based on entries in the actionField of a management message, according to an embodiment.

FIG. 10 is a table that depicts the value of the actionField for an Event-Report, according to an embodiment.

FIG. 11 is a table that depicts the assignment of fields in a management TLV, according to an embodiment.

FIG. 12 is a table that depicts an example assignment of values to ManagementId.

FIG. 13 is a table that depicts the structure of a LOCATION_INFORMATION management TLV, according to an embodiment.

For clarity, identical reference numbers have been used, where applicable, to designate identical elements that are common between figures. It is contemplated that features of one embodiment may be incorporated in other embodiments without further recitation.

DETAILED DESCRIPTION

The distribution of time over packet networks is now ubiquitous. The dominant method is the use of the Network Timing Protocol (NTP) for support of general timing applications in general computing applications. However, these implementations, based on existing standards and conventions, are suitable for time alignments of the order of (several) milliseconds. Over the last decade, a new protocol, Precision Timing Protocol (PTP) has emerged supported by industry standards (IEEE 1588-2008, ITU-T Recommendations in the G.827x series). The key differentiator between NTP and PTP is that the new levels of precision that can be obtained with PTP support the needs of a variety of new applications and services. Both PTP and NTP are protocols for exchanging time-stamps associated with time-of-arrival and time-of-departure of designated packets and are thus, in principle if not practice, capable of similar performance levels.

Figure 1:
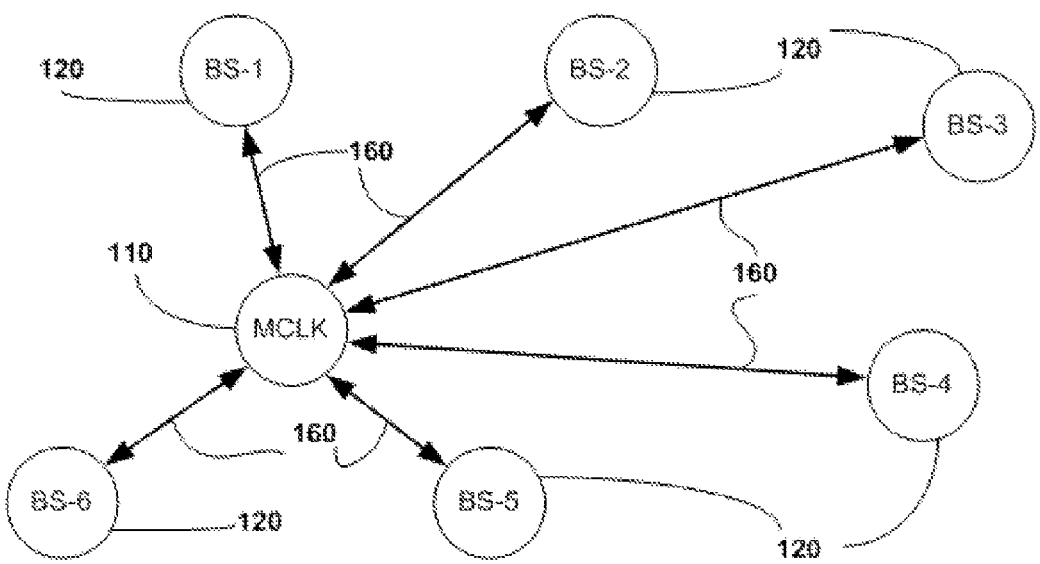
FIG. 1 depicts a conventional arrangement for distributing synchronization in a wireless network.
Figure 2:
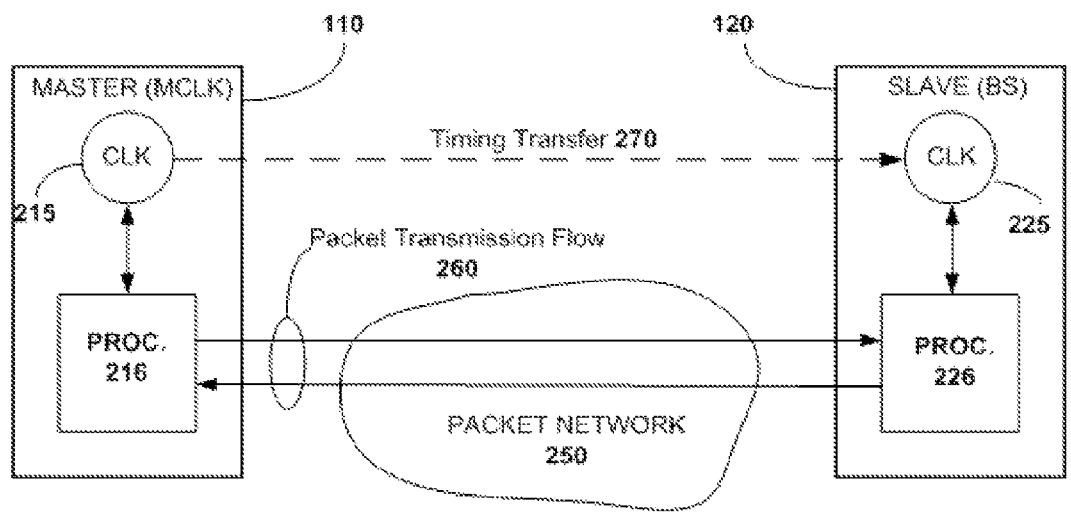
FIG. 2 depicts the essential elements of a master clock and a slave clock suitable for distributing synchronization over a packet network that is applicable to the case where a conventional wireless network utilizes a packet-switched network for implementing connectivity between base-stations and the communication network.
Figure 3:
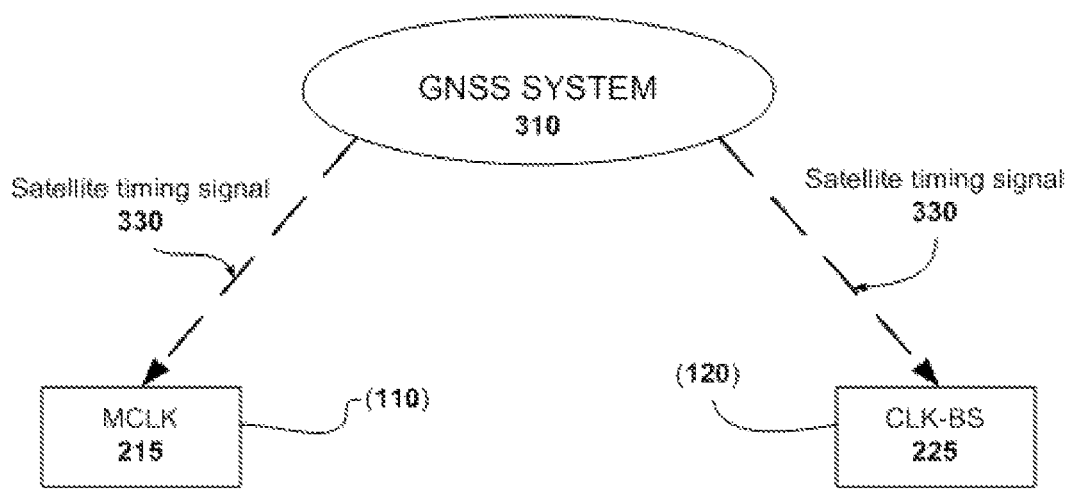
FIG. 3 depicts an arrangement whereby timing alignment between base-stations and the master clock is accomplished using GNSS techniques.
Figure 4:
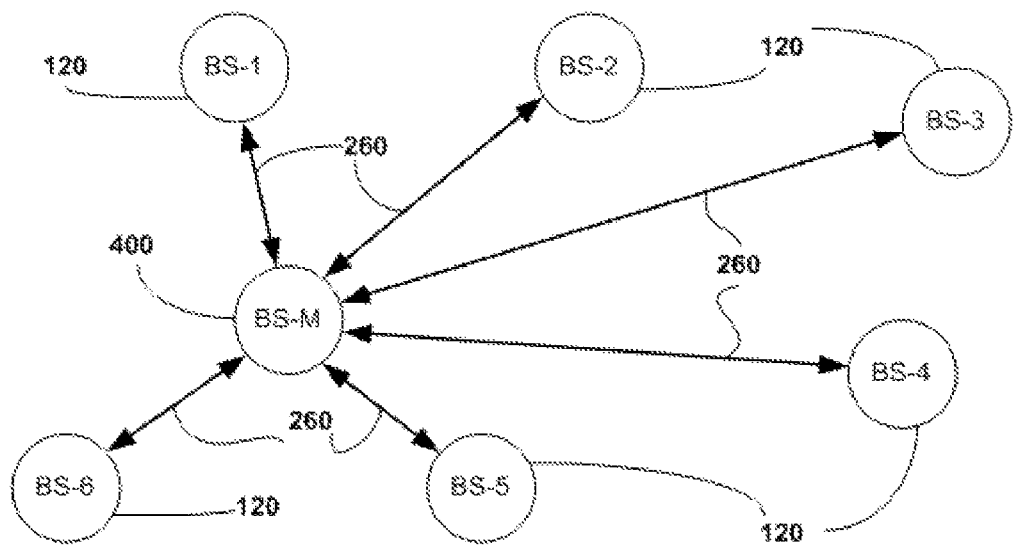
FIG. 4 depicts an arrangement whereby one base-station serves as the master for a PTP domain that includes several base-stations in the nearby geographical vicinity, according to an embodiment.

The deployment architecture for implementing the methods and techniques of the invention described herein is depicted in FIG. 4. A collection of base-stations 120 (BS-1 through BS-6 for example) and a "special" base-station BS-M 400 are all on the same network and constitute a PTP domain. BS-M 400 is different from base-stations 120 in that it is an "Edge Master." By this is meant that BS-M 400 has GNSS functionality. Since BS-M 400 has the best reference for time/frequency, it becomes the master of the PTP domain and all the other base-stations operate as slaves. That is, BS-M 400 operates as the master clock as represented in FIG. 2. The PTP domain thus is composed of the master 400 and a collection of slaves 120. Since these base-stations represent small cells, they are all located in a relatively small geographical area.

Delivery of time/frequency over packet-based networks is the subject of other patents/patent applications such as U.S. Pat. No. 8,385,212, entitled Method and Apparatus for Finding Latency Floor in Packet Networks; U.S. Pat. No. 8,427,963, entitled Method and System for Analyzing and Qualifying Routes in Packet Networks; and U.S. Pat. No. 8,644,348, entitled Method for Generating a Robust Timing Correction in Timing Transfer Systems; U.S. Pat. No. 8,064,484, entitled Enhanced Clock Control in Packet Networks, which are incorporated by reference herein in their entireties. Approaches to defeat transmission asymmetry are described in U.S. Pat. No. 8,594,134, entitled Precision Time Transfer over Optical Fiber; and U.S. Provisional Patent Application No. 61/749,565, filed Jan. 7, 2013 and entitled Universal Asymmetry Correction for Packet Timing Protocols, which are incorporated by reference herein in their entireties. It is feasible to have the remote time-stamping functionality described in U.S. Provisional Patent Application No. 61/789,957, filed Mar. 15, 2013 and entitled Distributed Two-Step Clock, which is incorporated by reference herein in its entirety, as an integral part of BS-M 400.

Figure 5:
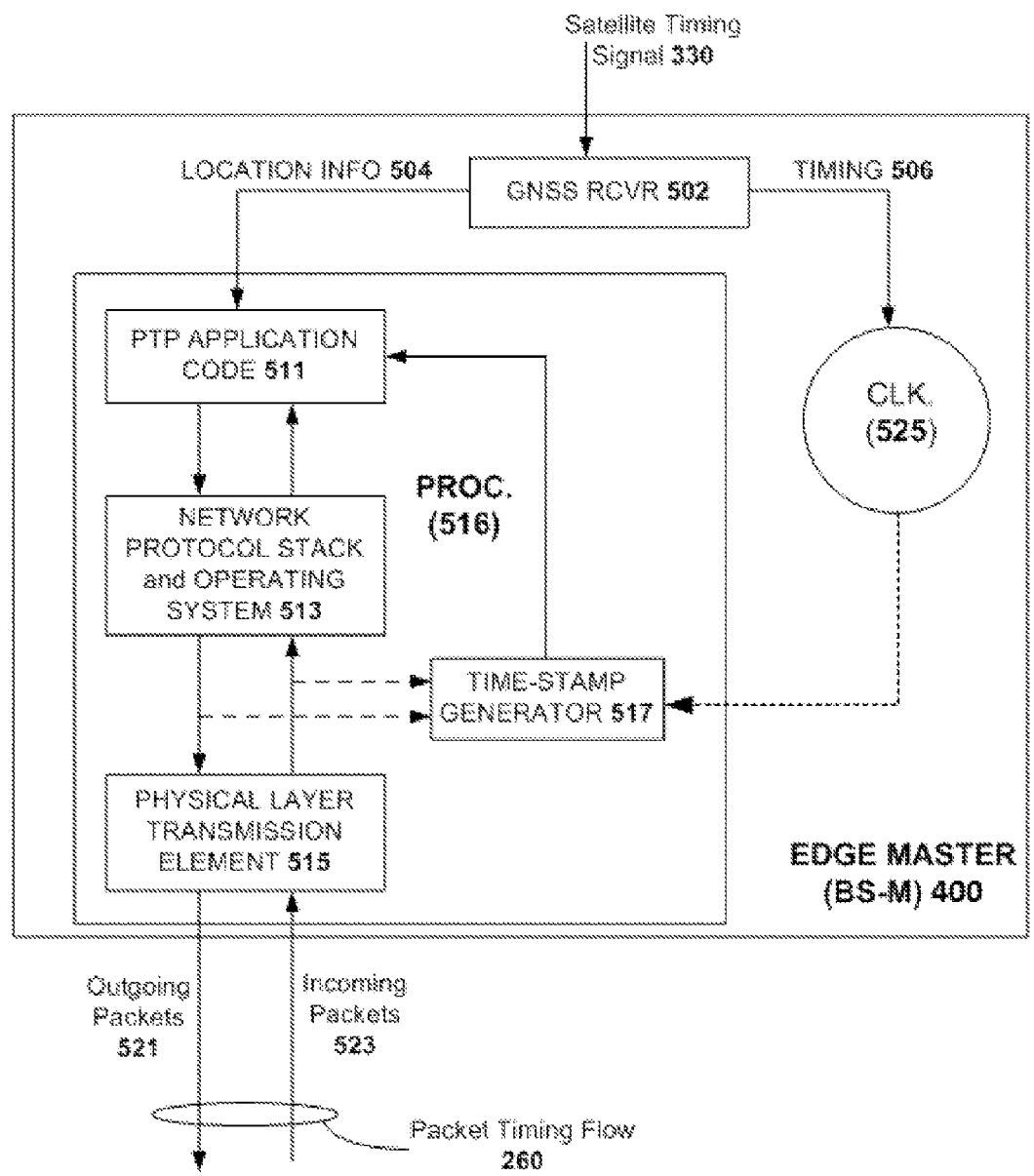
FIG. 5 depicts the essential elements of the clock system in the base-station acting as the base-station-master, also referred to as Edge Master, according to an embodiment.

Some of the relevant features of BS-M 400 are depicted in FIG. 5. The block labeled "PROC." 516 represent functions that are common to all PTP implementations. The GNSS Receiver 502 provides a suitable timing (time and frequency) reference 506 to the clock 525 which thus can be considered to be aligned with the (common) GNSS timescale. The PTP block operates in a master mode, delivering the packet timing flow 260 to the other base-stations within the PTP domain.

The location information 504 provided via the GNSS receiver establishes the location of the master device BS-M 400.

The BS-M 400 distributes this location information using PTP based messaging to the slave base stations 120 that are in the master's PTP domain. The base-stations 120 use this location information as an approximation for their own geographical location. That is, the location information of the master BS-M 400 serves as a proxy for the location of the subtending slaves 120 in the master's PTP domain.

The base-stations BS-x 120 derive their timing from the "master" base-station BS-M 400. As indicated above, BS-M 400 is distinguished from the others by having means to establish its own location, typically using GNSS methods. A block diagram showing the principal components of BS-M, from the viewpoint of timing, synchronization, and location, is shown in FIG. 5.

The master clock BS-M 400 (also referred to herein as "Edge Master") serves as the master clock for the PTP domain composed of the master 400 and the slaves 120 that derive timing therefrom. These devices are all in relatively close geographical proximity and therefore the location of the master serves as a proxy for the location of the slaves. The invention described here shows how the slaves 120 can obtain the location information while maintaining the principles of the protocol standards and therefore can interoperate with slaves and masters that conform to the protocol standard. The standard assumed herein is PTP, specifically IEEE-1588-2008 and the master 400 derives its location information using GPS methods.

GPS-based location offers a very efficient and accurate synchronization and location solutions for outdoor scenarios. In order to be able to properly estimate time and position, the GPS receiver needs to have an unobstructed line of sight to at least four GPS satellites. However, GPS fails to provide an acceptable level of accuracy in indoor and urban environments. Therefore, it cannot be easily used to synchronize base stations in indoor environments and in some urban environments where most satellites are obscured by buildings. IEEE 1588-2008 is typically used to synchronize indoor base-stations (e.g. 120) to the Edge Master 400. The PTP Edge Master 400 can be used to transmit its location information to the base-stations that are being synchronized. Provided that the base-stations are not located too far from the Edge Master, this location information can be used to approximate the position of the base-stations.

The GPS receiver in the Edge Master 400 provides the location information 504. The essential components of the location information 504, according to one embodiment, are shown in FIG. 7.

The preferred embodiment described here sends the GPS location information 504 over the PTP management channel implemented between the PTP slave and the Edge Master acting also as a PTP manager. This management channel is used to query and configure clocks. Since the published standard IEEE 1588-2008 does not provide a notification service, a notification service is implemented as a proprietary extension of the protocol in order to trigger the transmission of the GPS location information of the Edge Master to the PTP. The standard does provide guidelines on permissible extensions based on "TLV" (Type Length Value) constructs.

Figure 6:
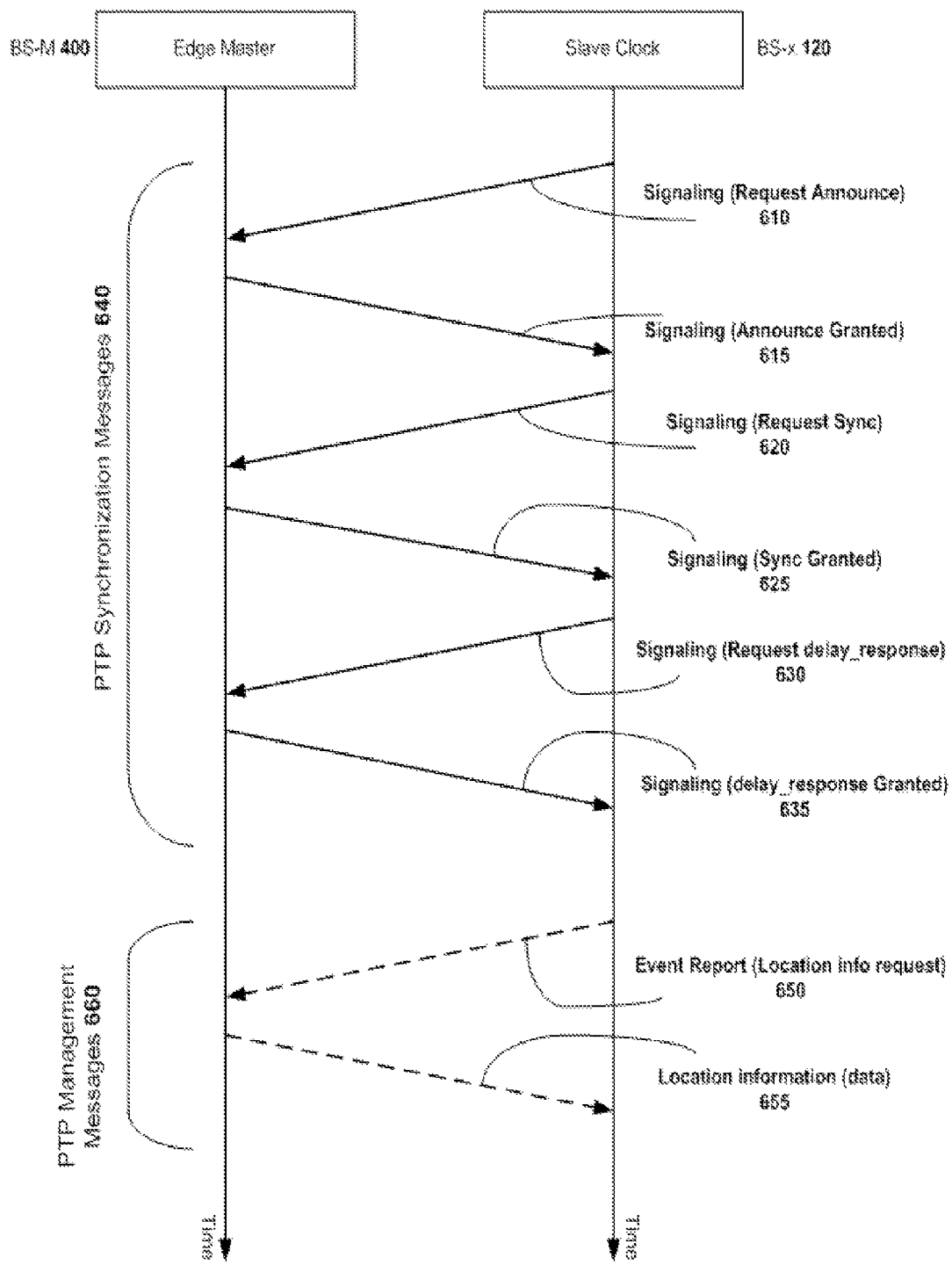
FIG. 6 portrays the messages flowing between the master and the slave clocks, composed of synchronization messages and management messages, according to an embodiment.

As shown in FIG. 6, the master and slave exchange PTP synchronization messages 640 at 610-635. Whereas only one set of exchanges is shown, synchronization message exchanges occur on a continual basis. In addition, FIG. 6 shows one exchange of management messages 660 at 650-655. There is no prescribed rate for such messages, nor does the standard prescribe a particular order or sequence that must be followed. Interspersing management messages between the exchange of synchronization messages is permitted.

Once the slave 120 is locked to the Edge Master 400, the slave 120 issues an Event_Report management message to request the GPS location information. The Event_Report is an extension of PTP management messages and is an implementation of a notification service. 1588 PTP-2008 does not define such a mechanism in the standard, but it provides a mechanism to extend the management messages. In one embodiment, the management messages may be extended to include an actionField value for the Event-Report and a management TLV dataField which specifies information to be reported back to the slave upon the occurrence of a certain event, as discussed in greater detail below. The Edge Master 400 keeps track of all active slaves 120 in a list.

IEEE 1588-2008 provides a network management mechanism to control the PTP slaves 120 using a TLV format. It defines management messages that are used to access attributes and to trigger events. In one embodiment, the TLV managementId field includes a managementId values table that is extended with a proprietary value LOCATION_INFORMATION that is used to hold the location information of the master base station. LOCATION_INFORMATION itself may include a number of parameters such as a timestamp, latitude, longitude, etc., the values of which are stored in a dataField of the TLV of a management message sent from the master base station to the slave base station.

In one embodiment, the management messages implement the format provided in FIG. 8:

1. Header

This is the common message for all PTP messages (See IEEE 1588-2008 section 13.3.1)

2. targetPortIdentity (PortIdentity)

For a message generated by a manager, it is the portidentity or node associated to the managed entity. In the case of a response to manager, it is set to sourcePortIdentity of the management message to which it is a response.

3. startingBoundaryHops (UInteger8)

For a response to a management request it is used to calculate the number of retransmissions by boundary clocks the message experienced.

4. boundaryHops

It indicates the remaining number of successive retransmissions of the management message by boundary clocks receiving the message.

5. reserved 6. actionField (Enumeration4)

It indicates the management action that should be performed. The relevant actions are enumerated in FIG. 9.

IEEE 1588-2008 does not provide any management notification service. This service is very useful for a slave to send an unsolicited message to the manager. A notification service is convenient for a slave to notify the Edge master 400 in a manager role of its presence after it has locked to it. This is particularly useful for a PTP service in Annex F mode (multicast Ethernet). The Edge Master 400 can then use the SET operation to send its location data. Therefore, the preferred embodiment introduces a proprietary Event-Report notification as an extension of the operations defined in actionField.

As shown in FIG. 10, the Event-Report can, for example, be associated with an actionField value of 5 and indicate that the management message, transmitted from the slave base station to the Edge Master 400, includes a single management TLV with a dataField (i.e., the information bits of the TLV other than the header of the TLV) specifying information to be reported back to the slave base station upon the occurrence of a certain event. For example, the data may include a dataField value which specifies that, upon receipt of the management message, the Edge Master 400 should send its geographical location to one of the slave base stations 120.

7. Management TLV field format

The Management TLV field format is defined in FIG. 11.

7.1. tivType (Enumeration16)

The tivType is MANAGEMENT 7.2. lengthField (Uinteger16)

It is set to 2+N, where N is an even number.

7.3. managementId (Enumeration16)

Examples of values of the managementId field are shown in FIG. 12.

In the preferred embodiment, the managementId values table is extended with a proprietary value LOCATION_INFORMATION that is used to hold the location information of the Edge Master 400. LOCATION_INFORMATION is sent to the PTP slave using a SET operation. Examples of LOCATION_INFORMATION parameters are shown in FIG. 13. The values of such parameters may be stored in the dataField of the management TLV of the management message sent from the Edge Master 400 to one or more of the slave base stations 120. Persons skilled in the art will recognize that, if a slave base station 120 receives a management message with LOCATION_INFORMATION but does not understand it, then the slave base station 120 will ignore this value and the dataField information associated therewith. The particular parameters of LOCATION_INFORMATION depicted in FIG. 13 are as follows:

UTC Time Stamp (Octet[6]): UTC Time of position fix in hhmmss format (example: "12":hh 00-23 hours "34":mm 00-59 minutes "56":ss 00-59 seconds).

Latitude (Octet[9]): Latitude of fix in ddmmmmmml format (example: "34": degree 00-90 "44": minute (integer) 00-59 "0000":minute (fractional) 0000-9999 "N": North/South N or S).

Longitude (Octet[10]): Longitude of fix in dddmmmmmml format (example: "135": degree 000-180 "44": minute (integer) 00-59 "0000":minute (fractional) 0000-9999 "E": East/West E or W).

GPS Quality Indication (Octet[1]): Quality Indication in q format (example: "0" Fix not available or invalid, "1" Fix is valid.

No. of satellites used for positioning (Octet[2]): Number of satellites in use in nn format (example: 04 from to 00 to 12).

Dilution of Precision (Octet[5]): Dilution of Precision in dd.dd format (example: 02.34 Note 00.00 when position is interrupted or suspended).

Altitude (Octet[9]): Altitude in saaaaa.au format (example: "+" +/− sign relative to geoid 12345.6 00000.0 to 04000.0 "M" unit meters).

EOT (Octet[1]): End of path position in format 0x00—The End Of Text EOT marks the end of the Path Position.

Figure 14:
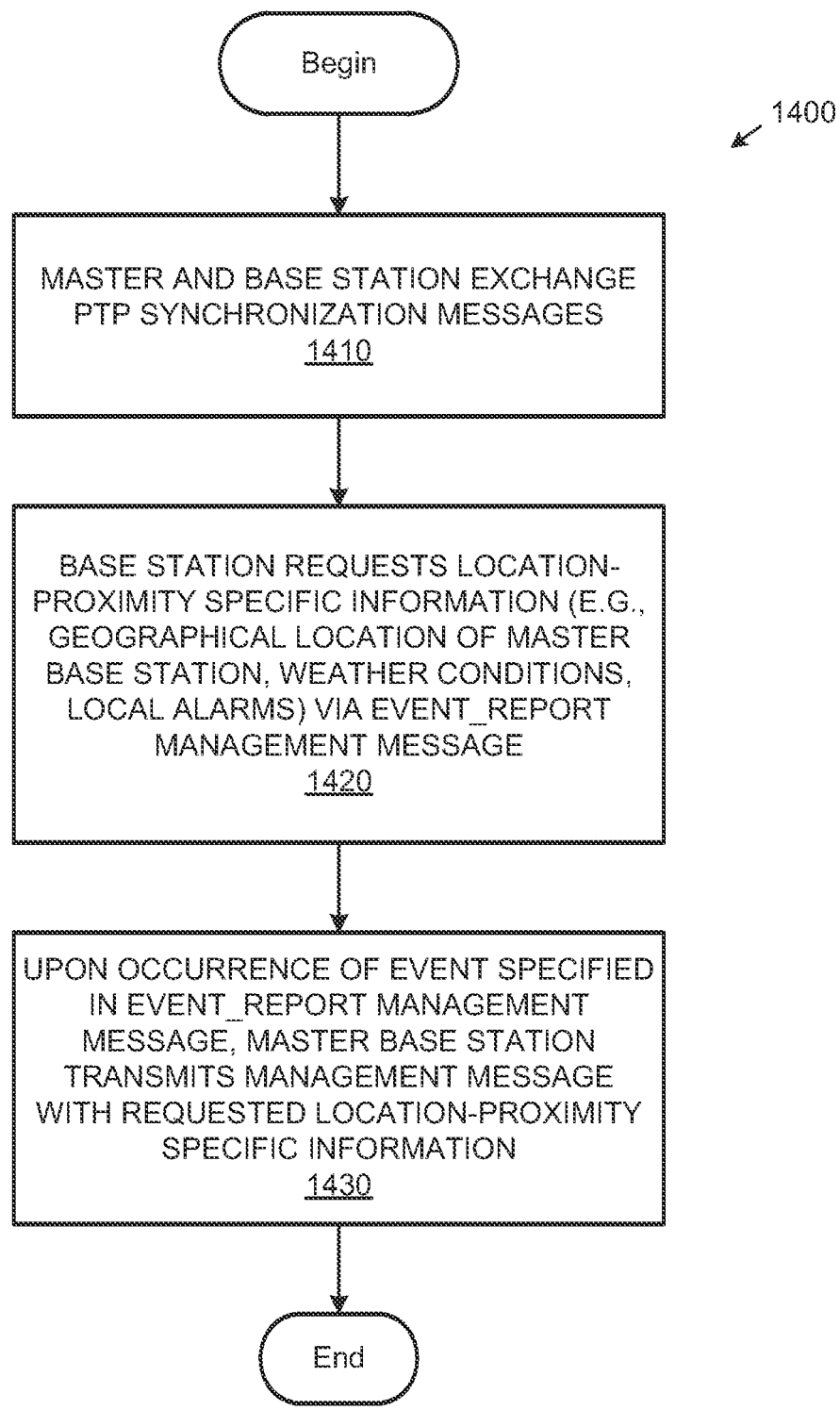
FIG. 14 is a flow diagram depicting a method for a base station to obtain location-proximity specific information from a master base station, according to an embodiment.

FIG. 14 is a flow diagram depicting a method 1400 for a base station (e.g., one of the base stations 120) to obtain location-proximity specific information from a master base station (e.g., Edge Master 400), according to an embodiment. At step 1410, the base station and the master base station exchange PTP synchronization messages. PTP synchronization messages are well-known to persons skilled in the art. In some cases, synchronization message exchanges may occur on a continual basis.

At step 1420, the base station requests location-proximity specific information by transmitting an Event_Report management message to the master base station. As discussed, the Event_Report management message is an implementation of a notification service. In one embodiment, the Event_Report management message may be a PTP management message that includes a predefined actionField value such as that discussed above with respect to FIG. 10. Specifically, the predefined actionField value may indicate that the management message includes a single management TLV with a dataField specifying location-proximity specific information to be reported upon the occurrence of a certain event. For example, the location-proximity specific information may be a geographical location of the master base station that the master base station establishes using GNSS techniques, and the event may be the receipt of the Event_Report management message. Alternatively, one or more slave base stations may establish their geographical locations and report this information to the master base station, which then distributes the information. Other types of information that are location-proximity specific include weather information and local alarm information such as fire and burglary alarm information. The base station may request to be notified of such weather information and local alarm information, similar to the request for geographical location information discussed above. In such cases, the event may be a weather update, a local alarm being issued, and the like.

At step 1430, upon the occurrence of the event specified in the Event_Report management message, the master base station transmits to the base station a management message with the requested location-proximity specific information. The management message with the requested information may include an actionField value of SET, a management TLV managementId value indicating the location-proximity specific information stored in a dataField of the management TLV, and the location-proximity specific information itself that is stored in the dataField. In the case of geographical location, the dataField may store, e.g., values for the LOCATION_INFORMATION parameters discussed above with respect to FIG. 13. As discussed, the base station that receives such geographical location information may use the information to establish its own geographical location. Other types of information such as weather information and local alarm information may be transmitted and used in a similar manner.

Note, IEEE 1588-2008 does not prescribe any rate for the synchronization and management messages of steps 1410-1430. Nor does there need to be a particular order or sequence that must be followed. For example, the management messages of steps 1410-1420 may be interspersed between the exchanges of synchronization messages of step 1410. Further, multiple synchronization and management messages may be exchanged.

Advantageously, techniques disclosed herein permit properties to be shared between a collection of base stations. In particular, a master base station may distribute geographical location information via PTP based management messages to slave base stations in geographical proximity to the master base station. Often, the geographical location of the master base station is adequate for the slave base stations to use as their own geographical locations. The master-slave communication may be achieved using allowed features of the timing protocol, such as a management TLV extension of PTP, and consequently will not result in interoperability if any slave base station is not equipped with the feature.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

We claim:

1. A method of determining a geographical location of a base station that is within a coverage area of a master base station, the method comprising:
 requesting geographical location information from the master base station via a first Precision Time Protocol (PTP) management message extended to enable a request to be included in a management Type Length Value (TLV) element of the first PTP management message, wherein the management TLV element specifies information to be reported from the master base station to the base station, the specified information including the geographical location information;
 receiving the geographical location information from the master base station via a second PTP management message extended to enable the geographical location information to be included in a management TLV element of the second PTP management message; and
 determining the geographical location of the base station from the geographical location information included in the second PTP management message.

2. The method of claim 1,
 wherein the first PTP management message includes an actionField value indicating that the first PTP management message includes the management TLV element with data specifying information to be reported from the master base station upon the occurrence of a given event.

3. The method of claim 1,
 wherein the second PTP management message includes a SET actionField value and a management TLV managementId field value which includes a value used to hold the geographical location information of the master base station, and
 wherein the geographical location of the base station is determined from the geographical location information included in the management TLV element of the second PTP management message.

4. The method of claim 3, wherein the geographical location information of the master base station includes a UTC Time Stamp, Latitude data, and Longitude data.

5. The method of claim 1,
 wherein the master base station includes a GNSS receiver system to determine a geographical location of the master base station, and
 wherein the geographical location information included in the second PTP management message includes the geographical location of the master base station.

6. The method of claim 1, wherein the master base station is an outdoor base station and the base station is an indoor base station.

7. A wireless communication base station positioned within a coverage area of a master base station and configured to perform operations for determining a geographical location of the wireless communication base station, the operations comprising:
 requesting geographical location information from the master base station via a first Precision Time Protocol (PTP) management message extended to enable a request to be included in a management Type Length Value (TLV) element of the first PTP management message, wherein the management TLV element specifies information to be reported from the master base station to the base station, the specified information including the geographical location information;
 receiving the geographical location information from the master base station via a second PTP management message extended to enable the geographical location information to be included in a management TLV element of the second PTP management message; and
 determining the geographical location of the wireless communication base station from the geographical location information included in the second PTP management message.

8. The wireless communication base station of claim 7,
 wherein the first PTP management message includes an actionField value indicating that the first PTP management message includes the management TLV element with data specifying information to be reported from the master base station upon the occurrence of a given event.

9. The wireless communication base station of claim 7,
 wherein the second PTP management message includes a SET actionField value and a management TLV managementId field value which includes a value used to hold the geographical location information of the master base station, and
 wherein the geographical location of the wireless communication base station is determined from the geographical location information included in the management TLV element of the second PTP management message.

10. The wireless communication base station of claim 9, wherein the geographical location information of the master base station includes a UTC Time Stamp, Latitude data, and Longitude data.

11. The wireless communication base station of claim 7,
 wherein the master base station includes a GNSS receiver system to determine a geographical location of the master base station, and
 wherein the geographical location information included in the second PTP management message includes the geographical location of the master base station.

12. The wireless communication base station of claim 7, wherein the master base station is an outdoor base station and the wireless communication base station is an indoor base station.

13. A method for a base station to obtain location-proximity specific information from a master base station, comprising:
 requesting the location-proximity specific information from the master base station via a first Precision Time Protocol (PTP) management message extended to enable the request to be included in a management Type Length Value (TLV) element of the first PTP management message, wherein the management TLV element specifies information to be reported from the master base station to the base station, the specified information including the location-proximity specific information; and
 receiving the location-proximity specific information from the master base station via a second PTP management message extended to enable the location-proximity specific information to be included in a management TLV element of the second PTP management message.

14. The method of claim 13, wherein the location-proximity specific information is geographical location information of the master base station.

15. The method of claim 14, further comprising, determining a geographical location of the base station from the geographical location information of the master base station.

16. The method of claim 14, wherein the geographical location information includes a UTC Time Stamp, Latitude data, and Longitude data.

* * * * *